United States Patent
Barry

(10) Patent No.: US 7,328,188 B1
(45) Date of Patent: Feb. 5, 2008

(54) DYNAMIC CURRENCY CONVERSION FOR CARD PAYMENT SYSTEMS

(75) Inventor: Gerard J. Barry, Salthill (IE)

(73) Assignee: Mainline Corporate Holdings Limited (IE)

( * ) Notice: Subject to any disclaimer, the term of this patent is extended or adjusted under 35 U.S.C. 154(b) by 1101 days.

(21) Appl. No.: 09/613,679

(22) Filed: Jul. 11, 2000

(30) Foreign Application Priority Data

Jul. 12, 1999 (IE) .................................... S990584

(51) Int. Cl.
*G06Q 40/00* (2006.01)
*G06Q 99/00* (2006.01)

(52) U.S. Cl. ............................ 705/40; 705/39; 705/40; 705/44; 705/76; 705/78; 705/79; 705/80; 235/379; 235/380

(58) Field of Classification Search ................. 705/40, 705/44, 41, 14, 26, 39, 76, 77–80, 1, 30, 705/35, 38, 65, 23, 43; 902/40; 235/379, 235/380
See application file for complete search history.

(56) References Cited

U.S. PATENT DOCUMENTS

| | | | |
|---|---|---|---|
| 3,386,458 A | 6/1968 | Wasserman et al. ......... | 137/114 |
| 3,723,655 A | 3/1973 | Zucker et al. ............ | 379/91.01 |
| 4,961,142 A | 10/1990 | Elliott et al. ............ | 705/73 |
| 4,962,531 A | 10/1990 | Sipman et al. ............ | 705/65 |
| 4,968,873 A | 11/1990 | Dethloff et al. | |
| 5,287,268 A | 2/1994 | McCarthy ................ | 705/14 |
| 5,386,458 A | 1/1995 | Nair et al. | |
| 5,416,306 A | 5/1995 | Imahata ................ | 235/380 |
| 5,448,047 A | 9/1995 | Nair et al. .............. | 235/440 |
| 5,661,517 A | 8/1997 | Budow et al. ............ | 725/60 |
| 5,671,285 A | 9/1997 | Newman ................ | 705/78 |
| 5,678,010 A | 10/1997 | Pittenger et al. ......... | 705/44 |
| 5,778,067 A * | 7/1998 | Jones et al. ............. | 705/65 |
| 5,826,245 A | 10/1998 | Sandberg-Diment ........ | 705/44 |

(Continued)

FOREIGN PATENT DOCUMENTS

EP 0251619 1/1988

(Continued)

OTHER PUBLICATIONS

Carol Power; "IRT Business & Finance (Wired on Friday): Big Apple not ready to abandon cash, trial finds"; IRish Times; Nov. 20, 1998; pp. 1 and 2.*

(Continued)

*Primary Examiner*—Ella Colbert
(74) *Attorney, Agent, or Firm*—Lowell W. Gresham; Jordan M. Meschkow; Charlene R. Jacobsen

(57) ABSTRACT

The present invention relates to Card Payment Systems for use in a multi-currency environment. In particular, the present invention provides a system and method for identifying an appropriate currency for individual transactions conducted using a card payment system, using the steps of identifying (50) an identifier code (60(1-$n$)) from a payment card, and determining (52) from the identifier code (60(1-$n$)) a suitable currency (61(1-$n$)) for association with said payment card transaction. The identifier code is preferably a portion of the card number of the payment card. The transaction may be processed (54) in the suitable currency or the transaction amounts may be displayed in the suitable currency for information purposes.

36 Claims, 10 Drawing Sheets

U.S. PATENT DOCUMENTS

| | | | | |
|---|---|---|---|---|
| 5,842,185 A | | 11/1998 | Chancey et al. | 705/40 |
| 5,870,473 A | * | 2/1999 | Boesch et al. | 705/78 |
| 5,937,396 A | * | 8/1999 | Konya | 705/43 |
| 6,546,373 B1 | * | 4/2003 | Cerra | 705/19 |
| 2001/0011241 A1 | * | 8/2001 | Nemzow | 705/35 |

FOREIGN PATENT DOCUMENTS

| | | |
|---|---|---|
| EP | 0 843 292 A2 | 5/1998 |
| EP | 830656 B1 * | 4/1999 |
| JP | 54061598 | 5/1979 |
| JP | 5189664 | 7/1993 |
| JP | 9305822 | 11/1997 |
| JP | 10269395 | 10/1998 |
| JP | 11066208 | 3/1999 |
| WO | WO 95/12169 | 5/1995 |
| WO | WO 96/36024 | 5/1996 |
| WO | WO 97/04411 | 2/1997 |
| WO | WO 99/12136 | 3/1999 |

OTHER PUBLICATIONS

Panurach, Patiwat; "Money in electronic commerce: Digital cash, electronic fund transfer, and Ecash"; Communications of the ACM; V39; n6; Jun. 1996; pp. 1-8.*

Energy Services & Telecom Report (formerly DSR); "Utilities Internet for bills, vendor payments, power marketing"; vol. 39; No. 25; Jun. 18, 1998; pp. 1-2.*

Panurach, Patiwat; "Money in electronic commerce; Digital Cash, electronic fund transfer, and ECash"; ACM; v39n6; Jun. 1996; pp. 45-50.*

Nevill, Nankivell; "The cash for e-cash $60B in savings"; Jul. 22, 1999; Financial Post; pp. 1-3.*

"Fexco Launch Multi-Currency Management Terminal," Innsight, published Mar. 1999/Fexco Group News, published First Quarter 1999.

"Currency Conversion at the Point of Transaction," Visa member letter EU 58/97, published Dec. 1997.

"Dual Currency Terminal Application," NaBanco's Caribbean News, vol. 8, published May 31, 1995.

"The Power to Grow" VeriFone published Feb. 1997.

"Identification cards—Identification of issuers" BSI Standards, published Aug. 15, 1995.

"Erste Kartenzahlung in Euro mit Visa: Mit dem ersten Testkauf in Euro startet Visa zur Einheitswahrung durch" Visa—Presse & Fakten, published Jul. 15, 2002.

The High Court of the Republic of Singapore, Judgement, Case No. [2006] SGHC 233, Main-Line Corporate Holdings Limited v. United Overseas Bank Limited . . . , Dec. 21, 2006.

* cited by examiner

| 00000 | IR£ |
| :- | :- |
| ⋮ | ⋮ |
| ⋮ | ⋮ |
| 59990 | US$ |
| 60000 | STG |
| 60001 | YEN |
| ⋮ | ⋮ |
| ⋮ | ⋮ |
| 99999 | Euro |

DYNAMIC CURRENCY CONVERSION FOR CARD PAYMENT SYSTEMS

BACKGROUND OF THE INVENTION

1. Field of the Invention

The present invention relates to Card Payment Systems for use in a multi-currency environment. In particular the present invention provides systems and methods for identifying an appropriate currency for individual transactions conducted using a card payment system.

2. Description of the Prior Art

Several types of Card Payment Systems are available, examples of which include credit cards, charge cards and debit cards.

An example structure of a Payment Card System is illustrated in FIG. 1 comprising a point of sale terminal 1, an authorisation host 2, a collection/management host 3, transaction collection system 4, a treasury management office 5, a clearing bank 6, a plurality of card schemes 7, and a plurality issuers 8,9. A point of sale terminal 1, according to the prior art is shown in FIG. 2, comprising means for accepting payment card details 20. Examples of such means for accepting payment card details include keyboards, magnetic swipe systems, smart card technologies and point-to-point radio transceivers (WO9912136). Alternatively, the terminal may be connected to a communications network, e.g. the Internet, and the means for accepting card details may comprise software which accepts card details forwarded by the cardholder in electronic form, e.g. data posted from a hyper text mark-up language (HTML) form.

A flowchart demonstrating a typical payment transaction as shown in FIG. 3, commences with entry of a payment card's details 30, the terminal makes a connection 31 with the authorisation host using its communications hardware and software 22. Typically, this connection 10 is made over a public telephone network or wireless link, any other communications may be used e.g. the Internet. Information concerning the card details and if required the transaction are passed 32 to the authorisation host. The authorisation host checks 33 to confirm that the card details are valid and that the transaction is permitted. If the card details are valid and the transaction value is permitted, the authorisation host sends 34 an authorisation code to the point of sale terminal which then allows 35 the transaction to proceed. Typically a transaction slip is printed 21 for signature by the cardholder, whereas for an Internet transaction a conformational HTML page or e-mail may be forwarded to the cardholder. Optionally, some systems may provide an option 36 enabling a merchant to cancel 37 a transaction at this stage. If the authorisation host decides that the card details are invalid or that the transaction is not permitted then no authorisation code is given and the authorisation host informs 39 the terminal that the transaction is not allowed to proceed. The terminal typically outputs 40 an error message to this effect.

If approved and the transaction is completed, then details of the transaction are stored 38 in the terminal 1 in a transactions table 23.

As required, the terminal connects with the collection host as illustrated in FIG. 4 over a communications link 11 and transmits details 43 from the transactions table 1 to the collection host 3. The terminal typically prints a report 44 for the terminal user detailing transactions transmitted. Once all of the transaction details have been communicated the terminal disconnects from the collection host 45.

The terminal is typically controlled by software 24 which is configurable to different situations by means of an alterable configuration file 25.

The transaction details contained in the transaction table are subsequently communicated from the collection host to a transaction collection host 4 which in turn passes these details onto a clearing bank 6. The clearing bank 6 then sorts the transaction details according to the card scheme used for a transaction. The transaction details are then forwarded to the appropriate card scheme 7, which sorts the transactions according to the card issuers, with transactions concerning a given issuer being passed onto that issuers computer system 8, 9. The issuers in turn assign the details of transactions against a particular card to that card holders account.

An alternative system provides an intermediary called a central payment router which acts as an interface between one or more terminals and the collection and/or authorisation host. This alternative system is typically used in larger retail outlets where there are a large number of terminals. The use of a central payment router provides for greater efficiency, lower overall cost and permits the central collection of transaction details for a merchant, as details do not have to be accumulated manually from each individual terminal.

The exact method or system of conducting or processing transactions may vary considerably from card system to card system, bank to bank or country to country. For example, frequently the authorisation host and collection host are one and the same. Examples of various apparatus, systems and methods for handling card payment transactions include U.S. Pat. No. 5,678,010, U.S. Pat. No. 5,671,285, U.S. Pat. No. 5,661,517, U.S. Pat. No. 5,448,047, U.S. Pat. No. 5,416,306, U.S. Pat. No. 5,287,268, U.S. Pat. No. 3,723,655, U.S. Pat. No. 4,961,142, U.S. Pat. No. 4,962,531, U.S. Pat. No. 5,386,458 and U.S. Pat. No. 5,826,245.

In general, transactions involving a card payment are conducted in the currency of the merchant. Accordingly, if a credit card is used for a purchase in the USA, the currency of the transaction will probably be US$. This restriction can be inconvenient for cardholders travelling abroad, as they are unsure of the exact value (in their own currency) of the transaction. It would be advantageous if a cardholder could make payments in their home currency rather than the currency of the merchant with whom they are conducting the transaction, or view the transaction amount in their own currency for their information.

Furthermore, with the introduction of the EURO, the potential for conducting transactions in the multi-currency environment has increased. Each country participating in the European Monetary Union (EMU) will have in co-existence two currency units the EURO and the national currency for a transition period. As the transition period is quite long, it is inevitable that different issuers and merchants will convert their base currency from the national currency unit to the EURO at different times, with the inevitable result that merchant and consumers may be using different currencies. In addition, the growth of Internet commerce permits consumers to purchase from a greater variety of sources than was previously available. A large proportion of these on-line transactions will be conducted in currencies other than that of the cardholder.

Accordingly, it would be advantageous if a cardholder could view and/or make payments in their home currency rather than the currency of the merchant with whom they are conducting the transaction.

A variety of point of sale and other systems are available which permit multi-currency transactions in which the cardholder may conduct the transaction in the currency of their choice. For example, the Trintech Group (Dublin) provide a compact point of sale terminal and system which facilitates payment by the customer in the currency of their choice at the point of sale. A problem with these existing systems is that the merchant must enter the desired currency for the transaction into the system. In order to do this the merchant must determine the currency of the cardholder and check to see if this currency is permitted. This involves the merchant looking at the card and/or cardholder and attempting a determination of what country the cardholder is from. This determination requires action and some intelligence on the part of the merchant. In addition, with the advent of the Internet the point of sale is the computer, no human merchant may be involved and the payment card is not available for inspection. This also applies for transactions conducted from a distance by other means, e.g. fax or phone.

Accordingly, it would be an advantage if a method and system could be provided for determining the currency of a cardholder at the point of sale automatically, using only a payment card's details.

U.S. Pat. No. 5,842,185 discloses a system and method for automatically entering financial transactions such as credit card transactions into a financial account stored in a computer. A financial statement incorporating the transactions is provided in an electronic form understood by the computer, such as a computer data file, for updating the financial account. For a credit card account, the electronic statement includes one or more credit card transactions such as purchases. Before accepting the electronic statement, the process verifies that the electronic form of the statement has not been altered since its creation and therefore correctly reflects transactions in the original statement. In the process of entering the transactions, they are tracked by automatically assigning them to expense categories. First the process determines from the electronic statement if a payee for a transaction is of record in the computer and, if so, assigns the transaction to a category already associated with the payee. If not, the process next determines from the electronic statement a merchant category code such as a Standard Industry Code (SIC). The merchant category code is associated with a category recognised by the computer, and the transaction is assigned to the recognised category. If no recognised category exists, the process prompts the user for a category to which the transaction can be assigned.

BRIEF SUMMARY OF THE INVENTION

A method for determining a preferred currency for association with a payment card transaction between a merchant and a payment card cardholder comprising the steps of obtaining the card number of the payment card from the cardholder, identifying an issuer code from said card number, determining the operating currency for said issuer code, and setting the currency for association with the payment card transaction as the determined operating currency for the issuer code.

The step of determining the operating currency for the issuer code preferably comprises the step of comparing the issuer identifier code with entries in a table. The table may contain a number of entries, each entry in the table containing an issuer code and a corresponding currency code. Alternatively, the entries may define ranges of issuer codes, with each range of issuer codes having a corresponding currency code.

The preferred currency is optionally set to default currency of the merchant when no operating currency can be determined for the issuer code.

The card holder may be prompted as to whether the transaction is to be conducted in the preferred currency. This prompting may comprise converting the transaction amounts to equivalent amounts in the preferred currency and presenting these amounts for review by the cardholder and/or presenting an exchange rate to the cardholder, said exchange rate corresponding to a rate between the merchants' currency and the preferred currency. If the cardholder indicates that the transaction is to proceed in the preferred currency, the transaction is processed in the preferred currency and/or if the cardholder indicates that the transaction is not to proceed in the preferred currency, the transaction proceeds in the merchants currency.

One or more of the transaction amounts may be converted to an equivalent amount in the preferred currency and presented to the cardholder. An exchange rate corresponding to a rate between the merchants' currency and the preferred currency may also be presented to the cardholder. These transaction details may be presented along with or instead of the merchants currency to the cardholder. The transaction details may be presented to the cardholder after cardholder approval has been obtained for the transaction and/or beforehand. In either case the amounts presented may be for information purposes only for the cardholder, based on nominal exchange rates.

Optionally, an initial check may be made to determine if the transaction amount exceeds a predetermined minimum level for processing in an alternative currency to that of the merchants currency.

Preferably, the steps of the method of the invention are performed substantially in an automatic fashion without input from the terminal operator.

The method is suitable for implementation on a payment card terminal, authorisation host, a central payment router or a combination of these devices.

The above method may also be extended to payment card transactions made over a computer network, for example the Internet, for example for e-commerce type transactions.

In one embodiment an apparatus is provided having means for determining a preferred currency for association with a payment card transaction between a merchant and a payment card cardholder, said means comprising; means for obtaining the card number of the payment card from the cardholder, means for identifying an issuer code from said card number, means for determining the operating currency for said issuer code, and means for setting the currency for association with the payment card transaction as the determined operating currency for the issuer code. The apparatus further comprises means for comparing said issuer identifier code with entries in a table. Each entry in the table may contain an issuer code and a corresponding currency code. Alternatively, the entries in the table may define a range of issuer codes, with each range of issuer codes having a corresponding currency code.

The apparatus may comprise means for setting the preferred currency to the default currency of the merchant when no operating currency can be determined for the issuer code.

A prompting means may be provided for prompting the cardholder as to whether the transaction is to be conducted in the preferred currency. This prompting means may comprise conversion means for converting the transaction amounts to equivalent amounts in the preferred currency and presenting these amounts for review by the cardholder. The prompting means may optionally further comprise a means for presenting an exchange rate to the cardholder, the exchange rate corresponding to a rate between the merchants' currency and the preferred currency.

An additional means may be provided for accepting an indication from the cardholder as to whether the transaction is to proceed in the preferred currency and means for permitting the transaction to be processed in the preferred currency if such an indication is received and/or permitting the transaction to be processed in the merchant's currency if no such indication is received.

Preferably, the apparatus is adapted to present at least one of the transaction amounts in an equivalent amount in the preferred currency to the cardholder and/or with an exchange rate corresponding to a rate between the merchants' currency and the preferred currency.

The apparatus may be adapted to present these details to the cardholder before and/or after cardholder approval has been obtained for the transaction.

Optionally, means may be provided for initially checking to determine if the transaction amount exceeds a predetermined minimum level for processing in an alternative currency to that of the merchants currency.

The apparatus may be implemented in a variety of embodiments, for example within a payment card terminal, a central payment router, an authorisation host, an authorisation host in co-operation with a payment card terminal, or an authorisation host in co-operation with a payment router.

In one embodiment, the apparatus comprises means for connecting to a node in a computer network. Preferably in this embodiment, the card number is received via the computer network. This embodiment is particularly suited to e-commerce type transactions.

According to the invention, there is provided a method and system for determining the currency of a cardholder at the point of sale automatically.

According to the invention, there is provided a transaction capture system for payment cards which automatically converts the transaction currency to that of the card issuers currency.

BRIEF DESCRIPTION OF THE DRAWINGS

FIG. 6 depicts an example of a bank reference table according to the present invention.

DETAILED DESCRIPTION OF THE DRAWINGS

Figure 5:
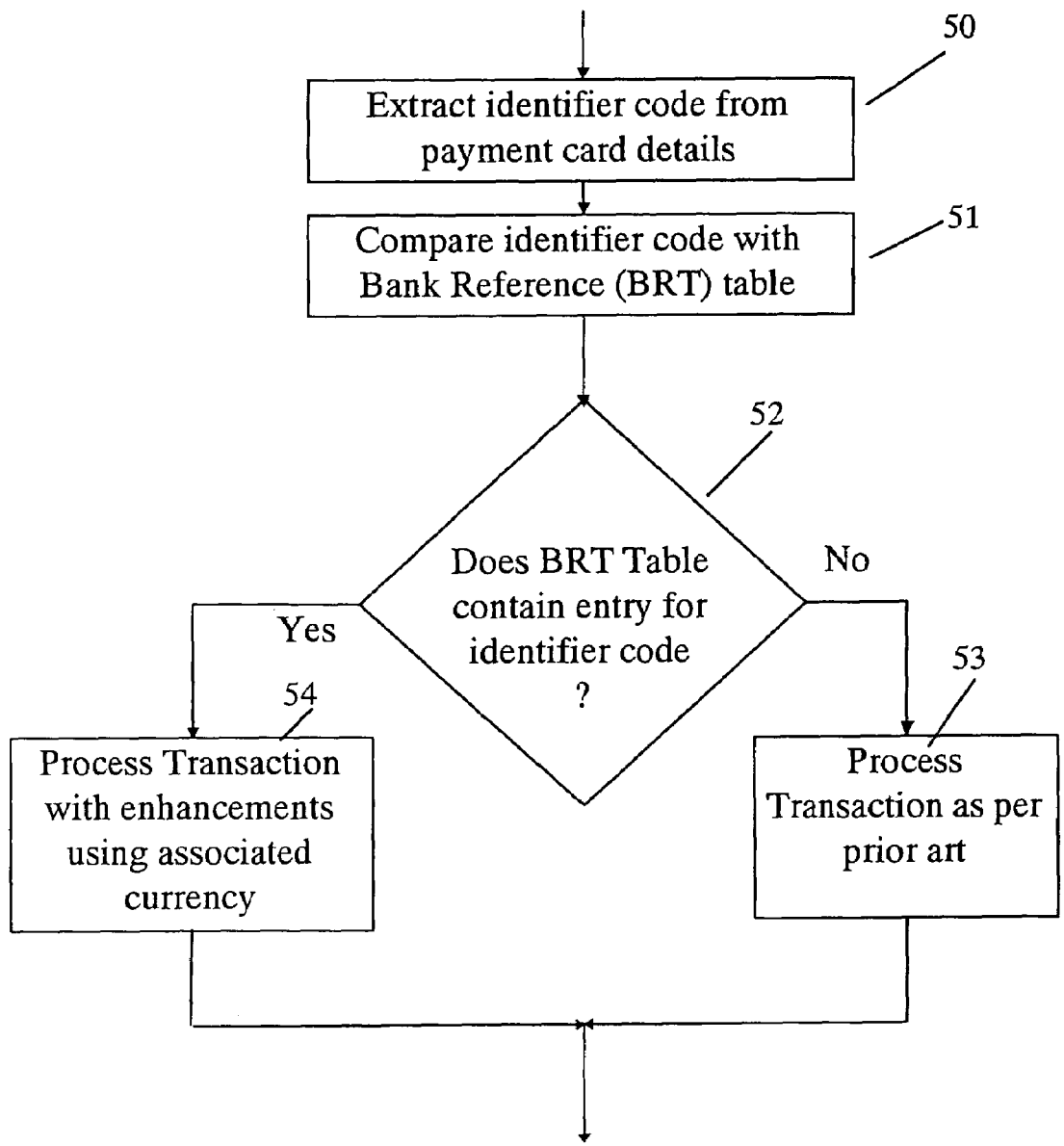
FIG. 5 is a flowchart of a method according to the present invention.

A flowchart of the operation of the present invention is illustrated in FIG. 5, in which an identifier code is extracted 50 from the payment card details. In the preferred embodiment, the identifier code consists of a portion of the payment card number.

Typically, payment card issuers are assigned a range of card numbers for issuing cards to customers. For example a small bank may be assigned the range 4555999033300000 to 4555999033399999, whereas a larger bank may be assigned 4555998800000000 to 4555998819999999. Accordingly, the identifier code is the portion of a card number which distinguishes between issuers.

The identifier code is compared 51 with entries in a bank reference table (an example of which is shown in FIG. 6), which contains a list of issuer identifier codes. Each issuer identifier code 60($1$-$n$) in the table has an associated entry 61($1$-$n$) containing an associated currency, which corresponds to the currency of payment cardholders accounts of the issuer. For example, if the issuer is an Irish Bank then the associated currency may be Irish Pounds or EUROs, similarly if the issuer is a UK bank then the associated currency is probably pounds Sterling. The bank reference table may be created from a number of sources, including the card scheme administration organisations or from data collected from a large number of cardholders.

If no entry is found in the bank reference table for the identifier code of the issuer of the card, then the transaction will be processed 53 as before in the prior art. If an entry is found for the identifier code, the associated currency corresponding to the issuer code is extracted and the transaction is processed with enhanced functionality 54 using the associated currency. A variety of enhancements are available, when the currency of the payment cardholders account is known.

For example, the transaction may be processed in the associated currency, as the amount of the transaction amount in the associated currency may be shown to the customer for informational purposes, a receipt could be printed showing the local currency and the associated currency equivalent, or a combination.

If the enhancements are performed at the terminal and involve a currency conversion, then currency exchange rates will be required. These currency exchange rates may be stored at the terminal and updated as required or they may be obtained from elsewhere, for example the authorisation host.

These enhancements may be provided as optional features, for example the merchant could inform the cardholder that the transaction may be conducted in the associated currency if desired. If the cardholder then so elects, then the transaction may be processed in the associated currency, otherwise the transaction is processed in the merchants currency. Alternatively, the enhancements could be made mandatory in the sense that the enhancements are performed in all cases. The cardholder is not given a choice.

Furthermore, the steps of the method illustrated in FIG. 5 may be implemented at several different stages of the transaction. For example, the steps of extraction 50, determination 51,52 and processing with enhancements 54 may be performed before the terminal connects to the authorisation host 2 (if the terminal connects to the authorisation host at all) or at any stage thereafter prior to completion of the transaction. Similarly, the steps of extraction 50, determination 51,52 and processing with enhancements 54 may be performed at the terminal, at the authorisation host, or at a combination of the two, for example the terminal may identify the associated currency and the authorisation host may perform the enhanced processing or vice versa.

It will be understood therefore that the software and/or hardware for performing the steps according to the invention may be located at a terminal, payment router or an authorisation host or any combination of these.

Figure 7:
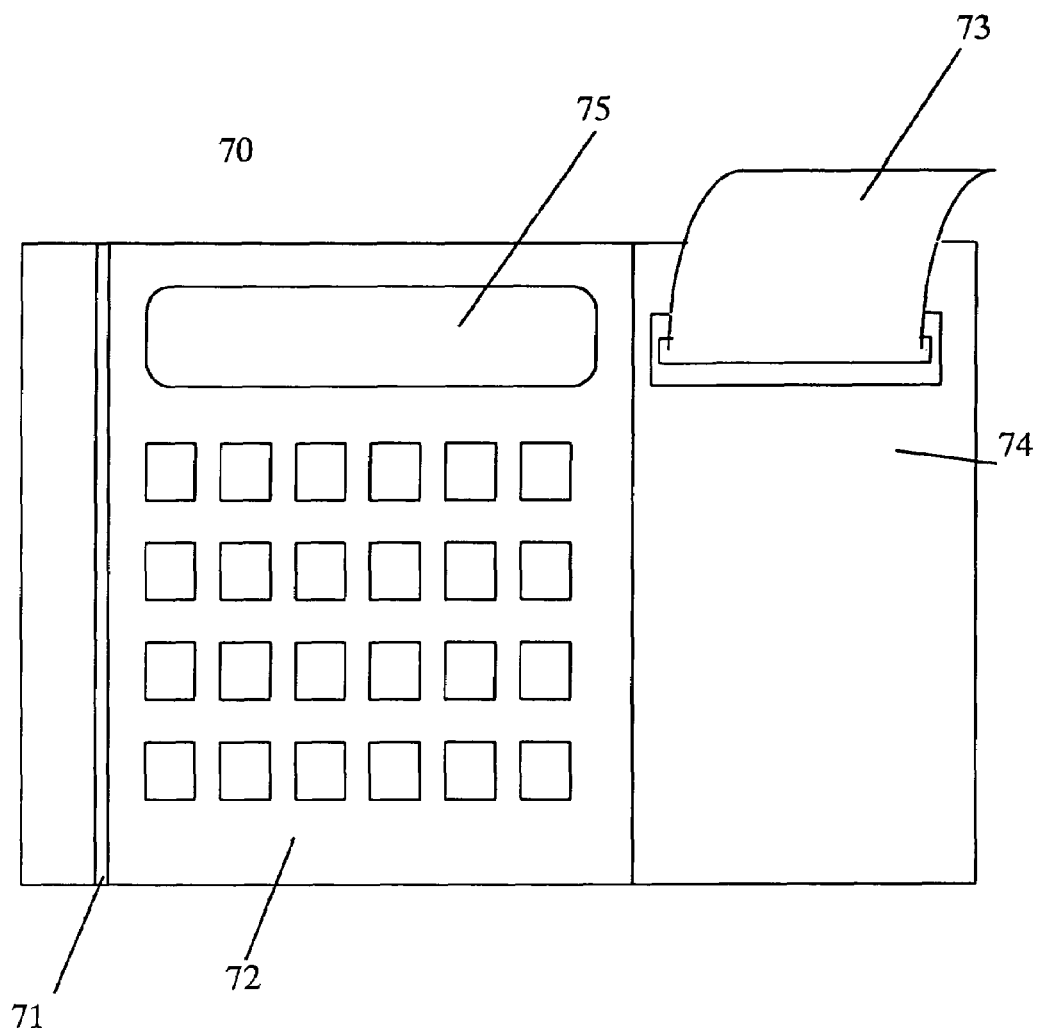
FIG. 7 illustrates a point of sale terminal according to the invention for use in a retail outlet.
Figure 8:
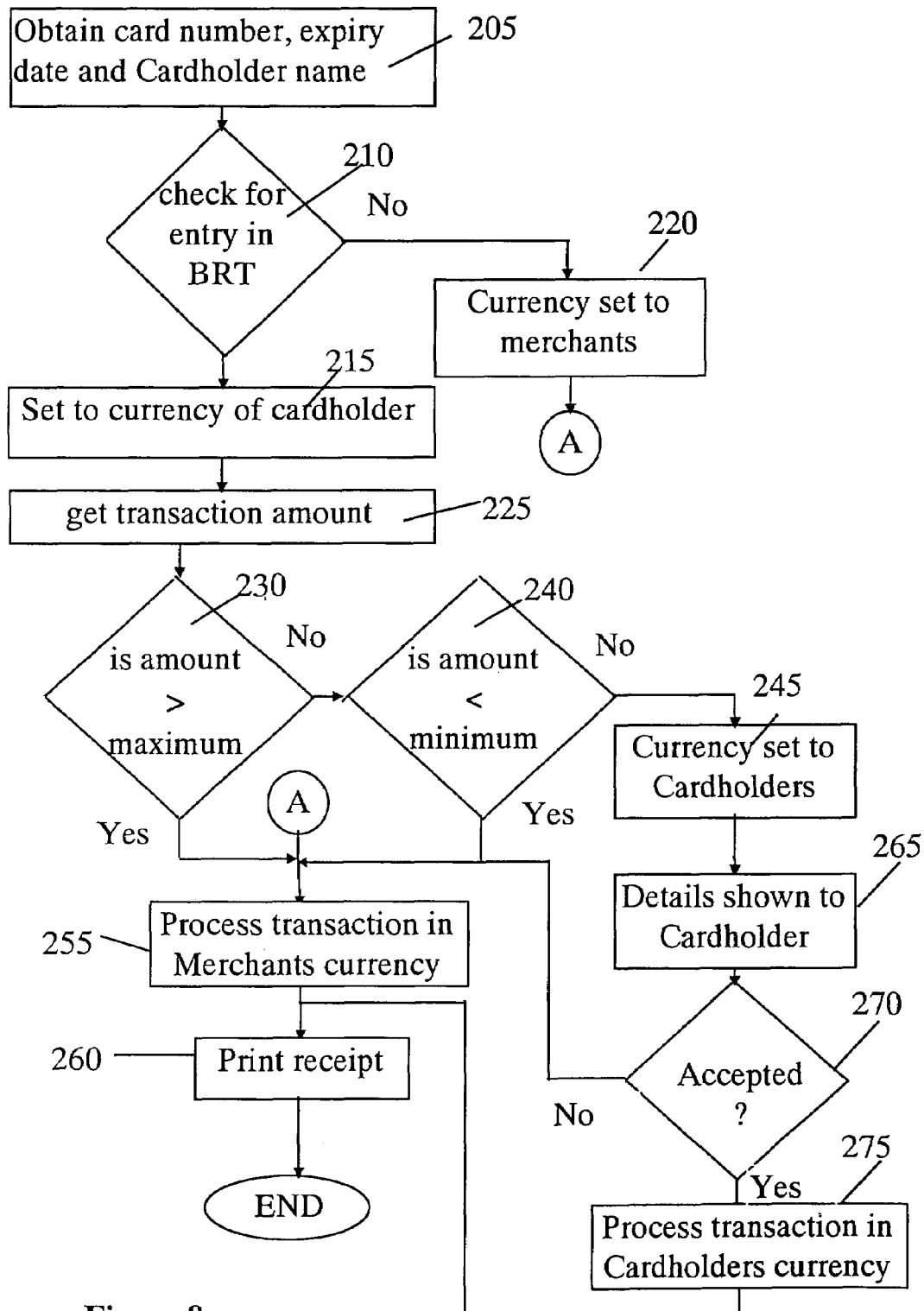
FIG. 8 is a flowchart showing the steps of a method according to an embodiment of the present invention performed on a point of sale terminal as shown in FIG. 7.

An example of a point of sale terminal according to one embodiment of the invention embodiment is illustrated in FIG. 7. The terminal 70 is suitable for use in the retail environment, e.g. shops, restaurants and hotels. The terminal 70 permits a merchant to offer a cardholder the option to pay for goods and/or services in the currency of the cardholder's card. The terminal 70 records the amount due to the merchant in their domestic currency. The terminal 70 then forwards the transactions for settlement to the appropriate settlement partner. In the event that the terminal 70 is unable to determine the currency of a card, the transaction will be processed in the currency of the merchant.

The terminal comprises a magnetic strip reader 71, an Alphanumeric and Function Keypad 72, a Display Unit 75, and a Receipt Printer 74 for printing receipts 73. Card details are entered either by swiping a payment card through magnetic strip reader 71 or using the keypad 72. Transaction details are entered using the keypad 72. Optionally, a Personal Identification Number (PIN) key pad (not shown) may be provided to allow a cardholder to enter a password. Internally, the terminal has suitable electronic circuitry for operating the terminal, typically comprising a Modem, a Power Supply Unit, Microprocessor, RAM and ROM Memory.

The circuitry and elements are preferably arranged to produce a terminal that has a small footprint and is compact.

The terminal software comprises of code which carries out the following functions; modem control, card reading, operator interface, authorisation, abbreviated bank reference table management, currency rate management, terminal configuration, printer control, authorisation/collection host communication, reporting and batching.

The modem control function is responsible for formatting data for transmission, removing formatting from received data, and operating the modem. The card reading function receives data from the magnetic strip reader and extracts the card details from this data. The operator interface receives data from the keypads, responds to the data and outputs messages to the display unit when required. The authorisation function is responsible for generating and sending an authorisation request to the authorisation host and for processing an authorisation or rejection code received from the host. The bank reference table is a table that stores the leading digits of individual issuers of credit/debit cards in the world and identifies an associated currency code for each issuer. The currency rate management is responsible for determining an appropriate exchange rate for a transaction and for maintaining a table of exchange rates. The terminal configuration function is used to enable a terminal to be configured for individual merchants, locations different merchants, etc. by permitting modification of a number of parameters. Examples of these parameters may include one or more of the following; Minimum Transaction Value for Conversion, Maximum Transaction Value for Conversion, Authorisation Limit/Floor Limit, Correct Date, Correct Time, Maximum Time between Batch-Ins, Host Identification Number, $1^{st}$ System Host Telephone Number, $2^{nd}$ System Host Telephone Number, $1^{st}$ Authorisation Telephone Number, $2^{nd}$ Authorisation Telephone Number, Next System Batch Number, Modem Speed, Base Currency Code, Merchant Master Number, Merchant Currency Numbers and Terminal Identification code. In order to operate correctly the terminal must be configured with all of these parameters. However, the terminal may operate in a limited fashion if a reduced number of parameters have been entered. Additional parameters to process an individual transaction may also have to be stored before the transaction may be processed, e.g. an appropriate Bank reference Table and/or the currency rates for the transaction date. The printer control function formats data and outputs the formatted data to the printer as required. The authorisation/collection host communication function controls the interaction of the terminal with authorisation and communication hosts. The reporting and batching function stores the transactions as they are entered and the collates them and forwards the resulting collated data to the collection host when the collection host is connected to the terminal.

In order for the terminal to operate properly, one or more of the following may be required; a connection to a standard PSTN dial-out telephone line, paper in the printer, an operating environment which is dry and of normal humidity and a connection to a mains supply voltage.

In operation, the terminal initially connects to a host and downloads the latest version of the terminal software as well as its standard configuration information. As soon as this download is complete the terminal will automatically dial the authorisation/collection host and collect the latest version of the Bank reference Table. The terminal downloads the currency rates to be applied over a future period. For each currency that the system is to convert a date, currency code and rate are downloaded. A report detailing rates received is printed. Once these tables have been received the System is ready to process transactions.

A typical transaction cycle is now described, commencing when the cardholder offers their payment card to the merchant as a means of payments for goods or services. The merchant typically swipes 205 the card in the magnetic stripe reader of the point of sale terminal. The reader extracts 205 the card number, expiry date and the name of the cardholder from the card.

The terminal software searches through the Bank Reference table and checks 210 for an entry corresponding to the issuer code obtained from the card number. If an entry is found the currency for the transaction is set 215 to that of the payment card. If no entry in the Bank Reference table is found the currency is set 220 to that of the merchant.

The terminal then requests 225 the amount of the transaction in the currency of the merchant which is keyed in using the numeric keypad. Alternatively, a connection may be provided to a cash register or other device to obtain directly the transaction total.

Optionally, the System may check to determine whether the transaction value in the Merchants currency is within the minimum 240 and maximum range 230 contained in the Systems configuration table. If the amount falls within the range it is processed in the cardholders currency transaction 245. If it is above or below the limit it is processed in the currency of the merchant 255.

For transactions processed in the cardholders currency as opposed to the merchants currency, the terminal 70 displays 265 the Cardholders Currency Code, the currency conversion rate and the amount in the cardholder's own currency. The cardholder decides 270 whether to consent to or reject the offer. If the offer is rejected the System may revert 255 to the Merchants currency amount. The cardholder may cancel the entire transaction regardless of whether the transaction is processed in the merchants or cardholders currency as in existing systems.

If the cardholder consents the transaction will be processed 275 in the currency of the card holder.

After determining the currency of the transaction, the terminal proceeds to determine if an Authorisation Code is required (not shown). This is determined by comparing the value of the transaction in the merchants currency against the pre-configured floor limit. If the value of the transaction is above the floor limit an Authorisation Code is sought.

The Terminal System Software initiates the modem and obtains a dial-out line and attempts to call the 1$^{st}$ Authorisation Host Number. If a connection is not received after a pre-configured number of attempts the System will attempt to place the call using the 2$^{nd}$ Authorisation Host Number.

If no connection is obtained to either Authorisation Host the transaction is rejected and a printed slip detailing the failure to connect to the Host is produced.

If a connection to an Authorisation Host is made, the communications software within the terminal establishes its identity with the Authorisation Host using industry standard protocols for such communications. The Terminal transmits the identity of the terminal, the Card Number, The Merchant Number for that currency and the value. The Authorisation Host can reject the transaction or respond with an Authorisation Number which is received and stored by the System. Once the Authorisation Code has been received the System disconnects from the Host and produces 260 a Transaction Slip typically detailing the following; Name and Address of the Merchant, Merchant ID, Terminal Number, Date & Time of the transaction, Cardholders Card Number, Authorisation Code, Transaction Values in the Merchant Currency, Transaction Value in Cardholders Currency, and area against, upon which the cardholder must sign consenting to the transaction. Similar details excluding the space for signature are stored in the transaction table.

A copy is produced for the merchant and the cardholder. After which, the transaction is completed between the cardholder and the merchant.

Figure 9:
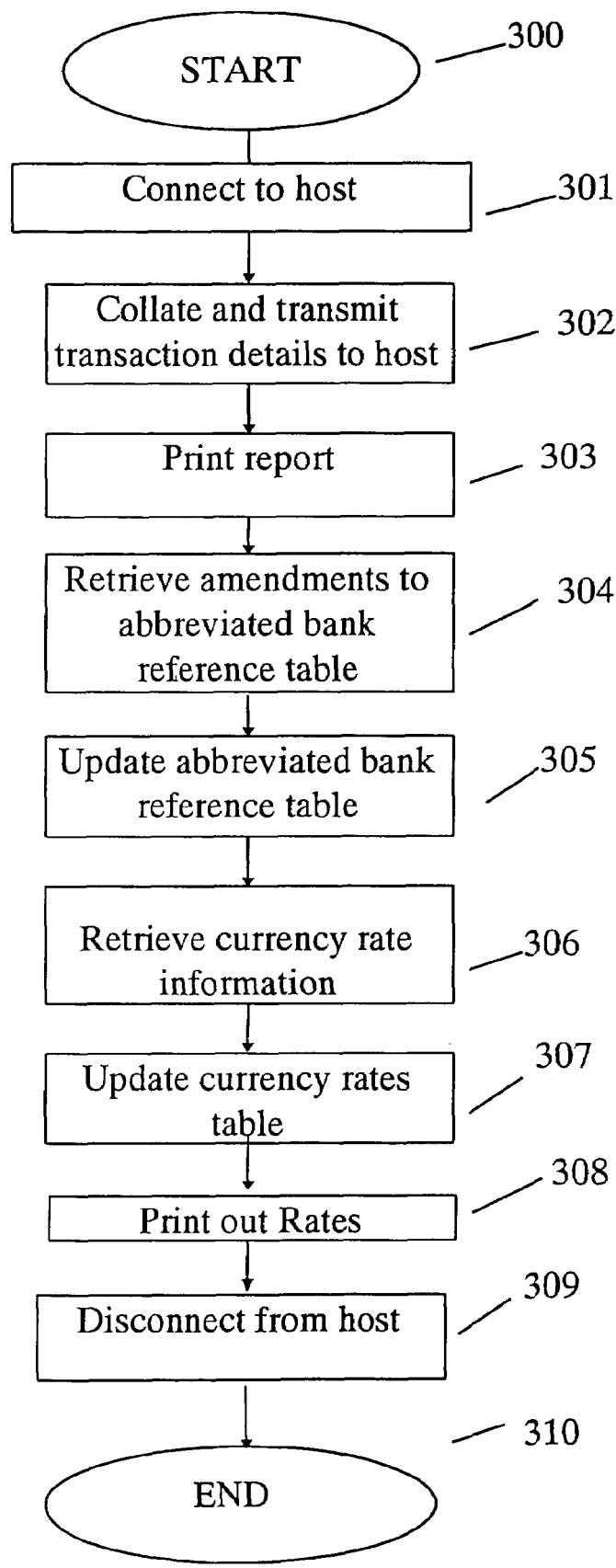
FIG. 9 is a flowchart of a 'batch-in' process according to an embodiment of the invention for use with a point of sale terminal as shown in FIG. 7.

At the end of each day the merchant can press a key to instruct the terminal to carry out a 'Batch-In' of the accumulated transactions to the Collection Host, the process of which is illustrated in FIG. 9, i.e. forward details of the transactions that have accumulated since the previous 'Batch-In' to the collection host. If the merchant does not manually request a 'Batch-In' process, a pre-configured parameter will detect the absence of a Batch-In and will automatically initiate 300 a Batch-In, the first step of which involves connecting 301 to the collection host.

During a 'Batch In', any transactions which have been processed by the terminal are collated and transmitted 302 to the Collection Host and a report is printed 303 summarising the transactions which have been forwarded in the transmission.

Figure 1:
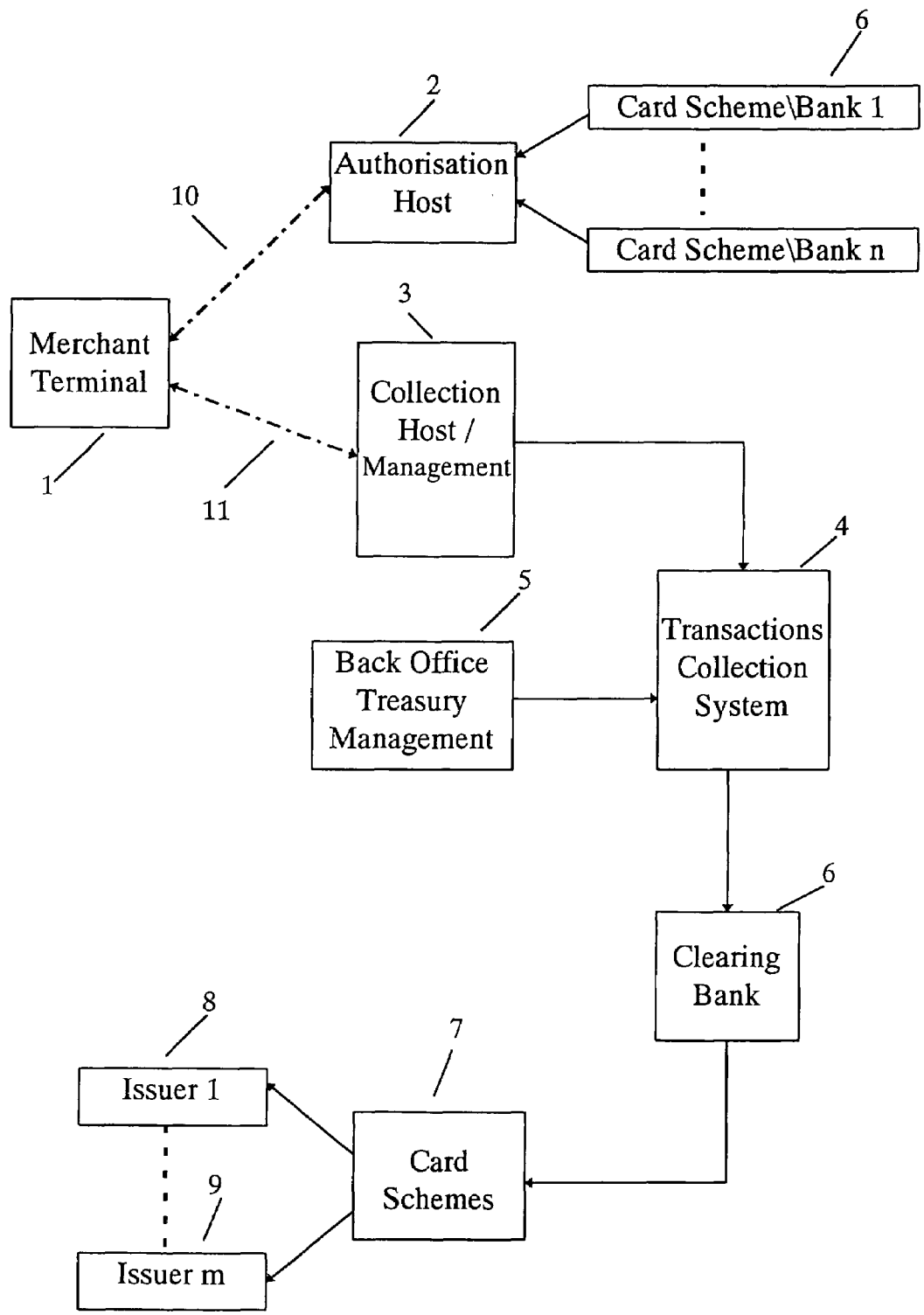
FIG. 1 shows a block diagram of a payment card scheme arrangement according to the prior art.
Figure 2:
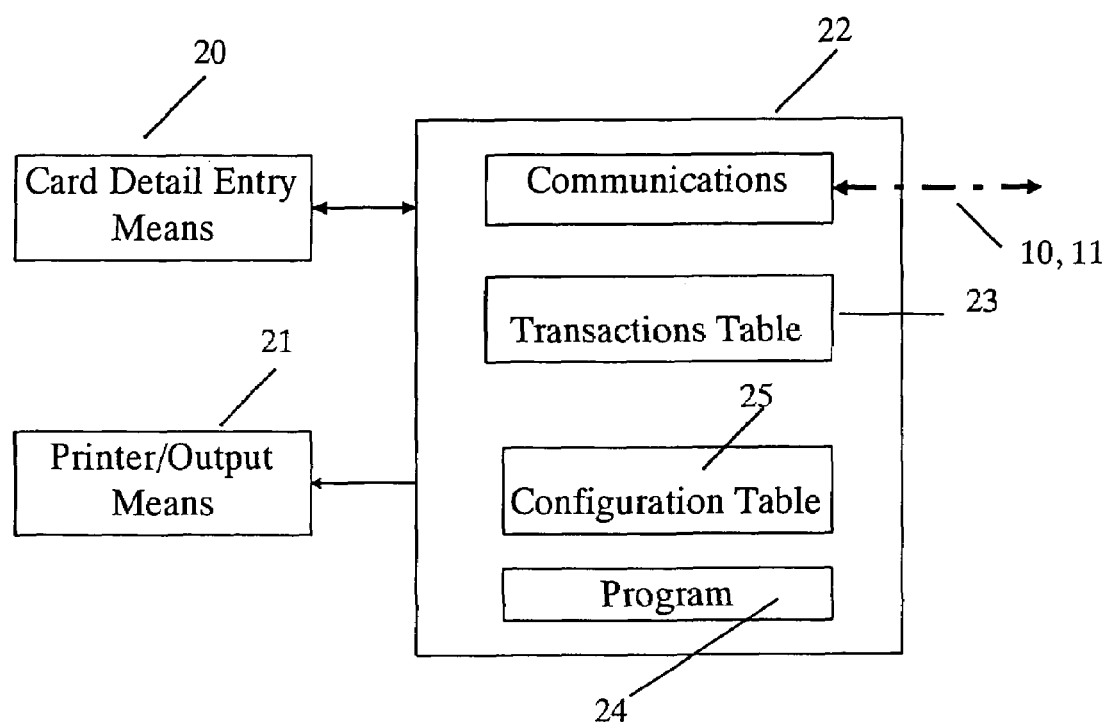
FIG. 2 is a payment card point of sale terminal according to the prior art.
Figure 3:
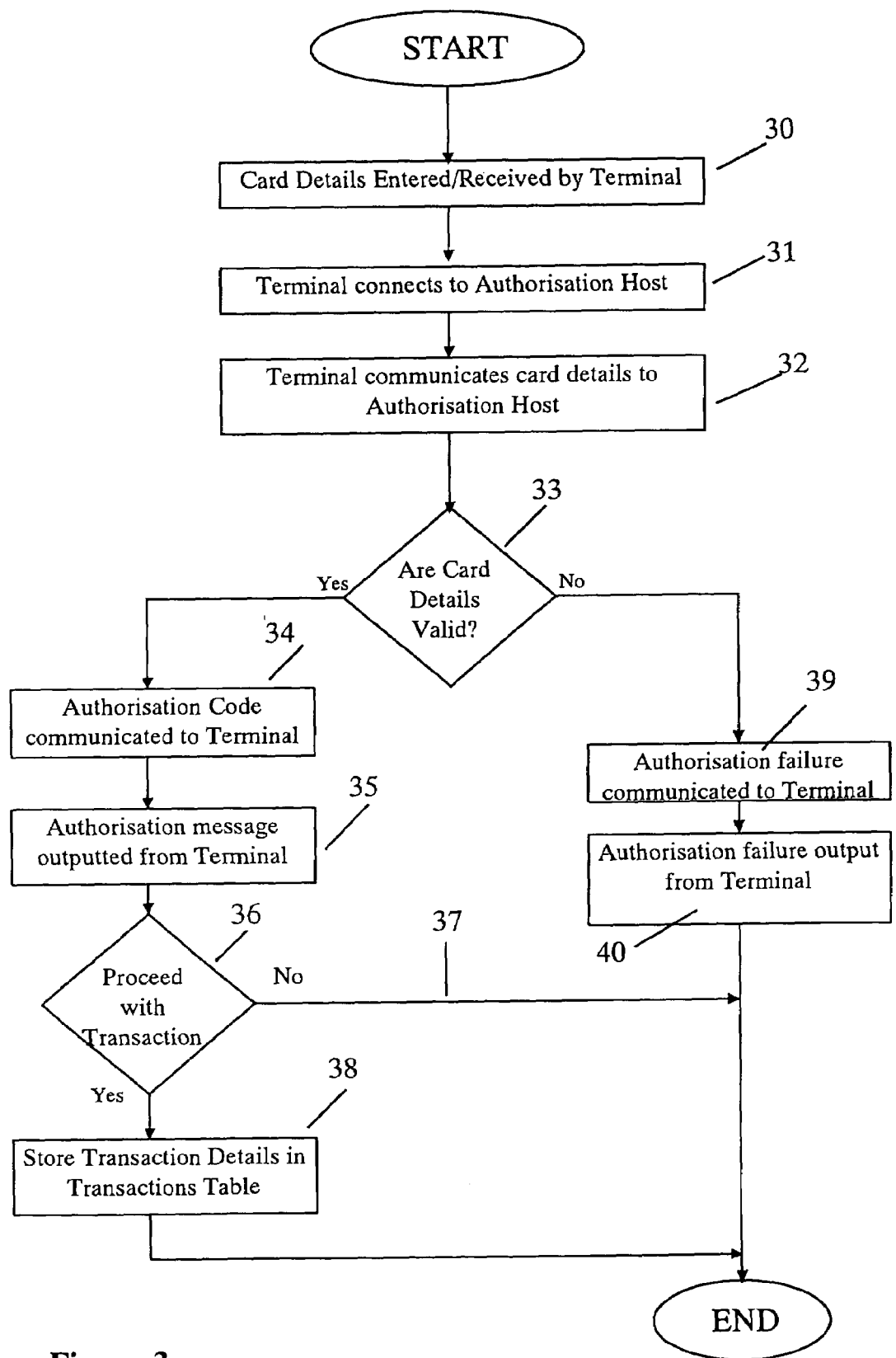
FIG. 3 is a flowchart demonstrating a typical authorisation request procedure according to the prior art.
Figure 4:
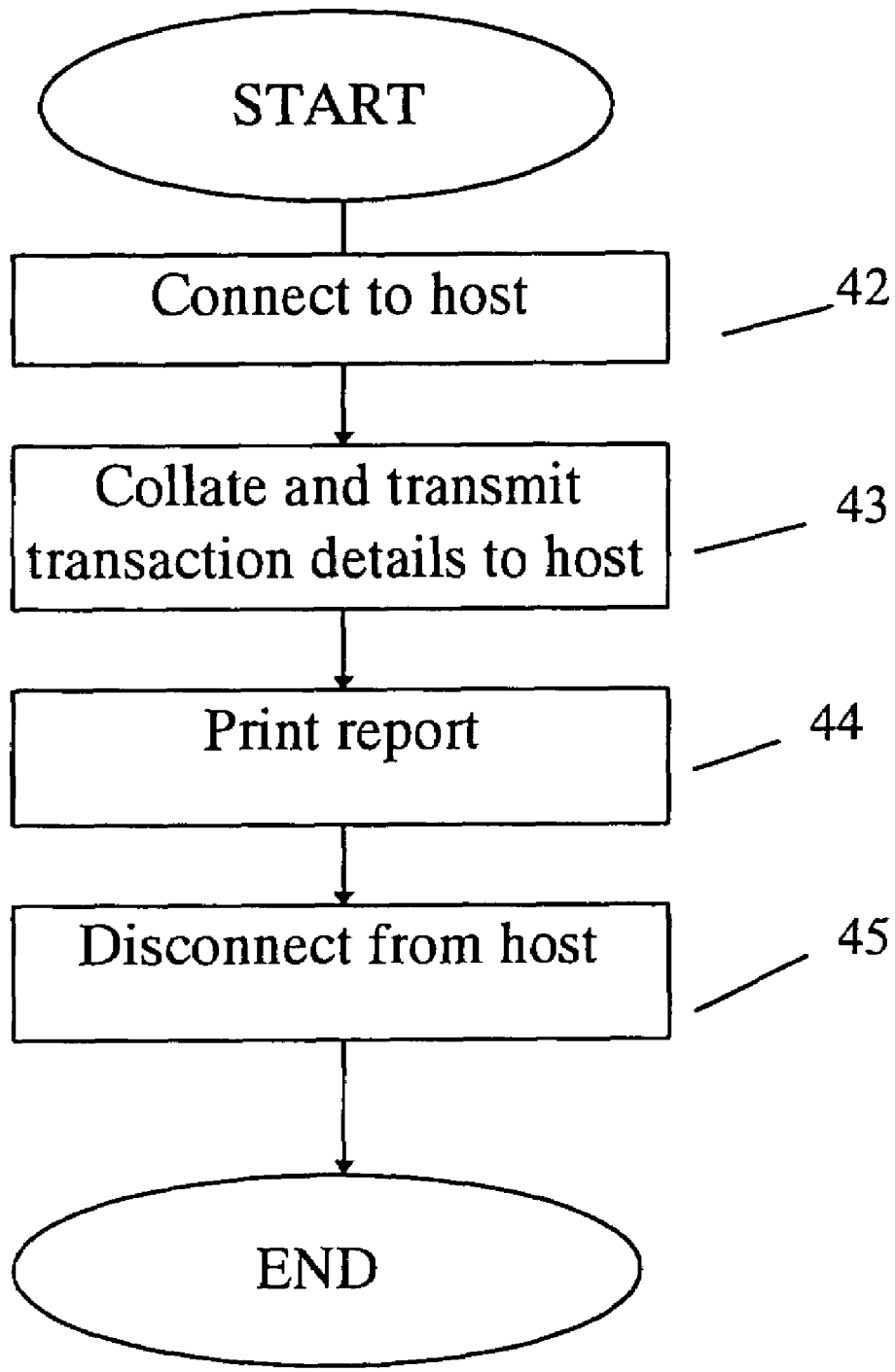
FIG. 4 is a flowchart illustrating a typical procedure for communicating transaction details to a collection host according to the prior art.

It will be appreciated by those skilled in the art, that in order to forward the transaction details to the clearing bank, some processing will be required to convert the details into a form which is usable by the clearing bank. This processing may be performed at the collection host or alternatively data may be forwarded to a back office for processing, illustrated as the transactions collection system in FIG. 1.

When the transaction have been successfully transmitted, the terminal will seek 304 any amendments to the bank reference table. Additions and deletions to the bank reference table are received and processed by the terminal.

After the bank reference table has been appropriately modified 305 the terminal will seek to update 307 its Currency Rates by obtaining 306 revised rates from the collection host. This update 307 will remove any expired rates and receive any new future rates. When the rates have been updated, a print out 308 is made of the new rates to be applied to future transactions.

At this point the terminal will disconnect 309 from the Collection Host. The batch-in is completed 310 and the terminal is ready to process further transactions.

It will be appreciated by those skilled in the art, that in order to forward the transaction details to the clearing bank, some processing will be required to convert the details into a form which is usable by the clearing bank. This processing may be performed at the collection host or alternatively data may be forwarded to a back office for processing, illustrated as the transactions collection system in FIG. 1.

Figure 10:
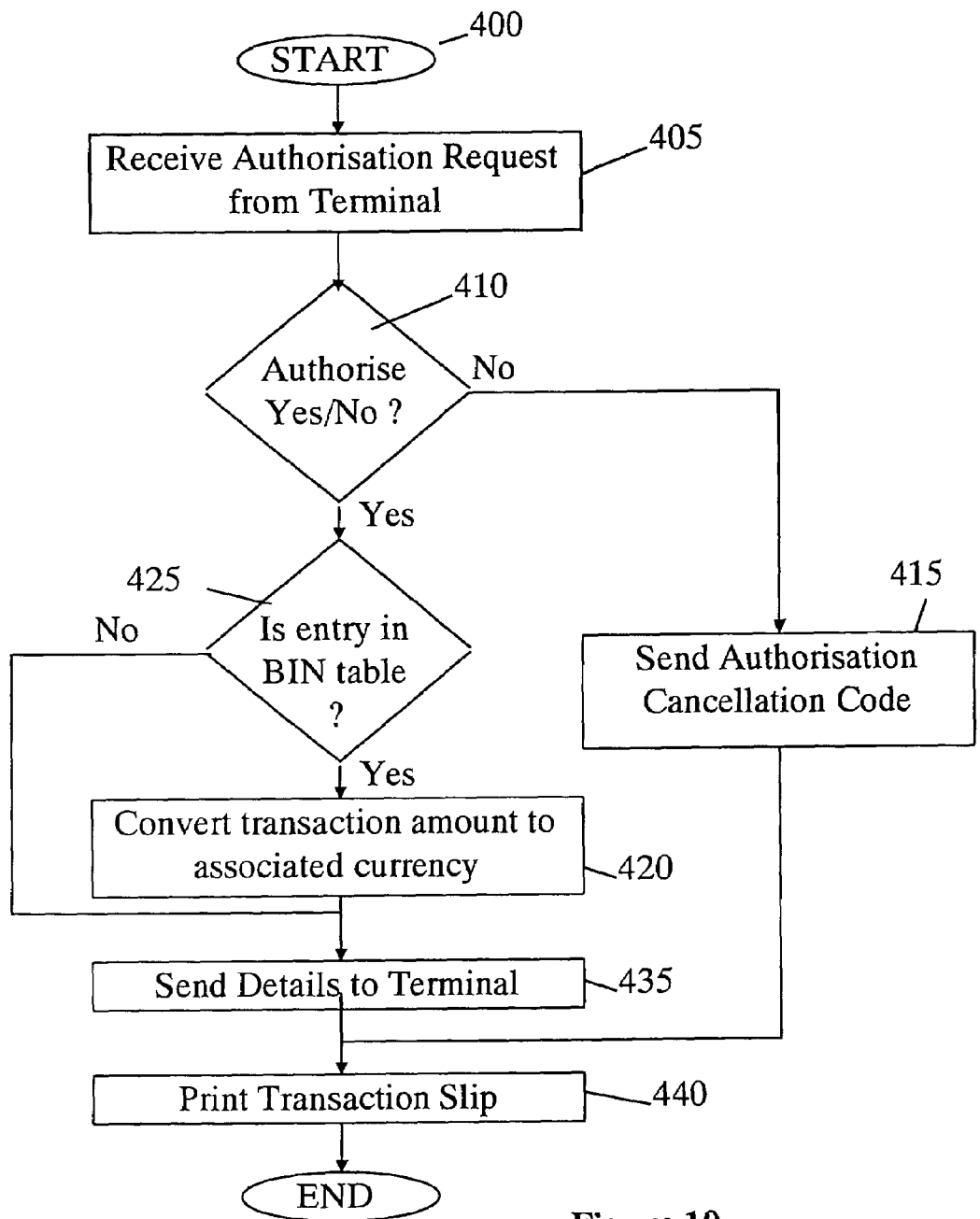
FIG. 10 is a flowchart illustrating the steps of another method for determining an associated currency and processing same according to the present invention.

An alternative embodiment is where the determination of the currency for a transaction is performed on the authorisation host. A flowchart of a method according to this embodiment is shown in FIG. 10. The operation is started 400 when a connection is made by a terminal to the authorisation host. Once a valid connection has been established, the terminal forwards 405 an authorisation request, containing card details and the transaction amount, to the authorisation host. The Authorisation host checks 410 to determine whether the transaction is to be authorised or not, if the transaction is not permitted a cancellation code is sent 415 to the merchant's terminal which prints 420 a transaction slip showing that the transaction is not permitted. If the transaction is authorised, the Authorisation host extracts the issuer code from the payment card details and checks 425 the extracted issuer code against entries in the bank reference table. If no entry is found in the bank reference table or if the currency associated with the issuer is the same as that of the merchant then the transaction details are unchanged and forwarded 435 back to the terminal along with the authorisation code. Alternatively, the host may simply send the authorisation code as the terminal already has the transaction details. If an entry is found in the bank reference table and the currency associated with the issuer is different from that of the merchant, the transaction amount is converted 420 to an equivalent amount in the associated currency. This converted amount and the associated currency code are forwarded 435, along with an authorisation code to the terminal. Optionally, the currency exchange rate used may also be forwarded. The terminal prints a transaction slip 440 showing the transaction amount in the associated currency and the associated currency code, which may be signed by the cardholder. The transaction slip may also show the merchants currency equivalent and the currency exchange rate used.

As with the previous embodiment, the terminal subsequently connects to the connection host and performs a batch-in.

It will be apparent to the skilled person in the art that the present invention can be implemented in most payment card systems and that the currency identification can be implemented at different stages of transactions. Accordingly, the foregoing description is by way of example only and is not intended as limiting. The present invention is only limited by the claims appended hereto and their equivalents. It will be understood by the skilled person in the art that a wide variety of embodiments are available which come within the spirit and scope of the present invention.

I claim:

1. A data processing method performed in a data processing system for determining a preferred currency for association with a payment card transaction between a merchant and a payment card cardholder, said method including the steps of:
   obtaining the card number of the payment card;
   in said data processing system, identifying an identifier code from said card number;
   determining the operating currency for said identifier code by comparing said identifier code with entries in a table wherein each entry in said table contains an issuer identifier code or range of issuer identifier codes and a corresponding currency code; and
   setting the currency for association with the payment card transaction as the determined operating currency for the identifier code.

2. A method according to claim 1, wherein the preferred currency is set to a default currency of the merchant when no operating currency can be determined for the identifier code.

3. A method according to claim 1, wherein the cardholder is prompted as to whether the transaction is to be conducted in the preferred currency, including the steps of converting the transaction amounts to equivalent amounts in the preferred currency and presenting these amounts for review by the cardholder.

4. A method according to claim 1, wherein at least one of the transaction amounts is converted to an equivalent amount in the preferred currency and is presented to the cardholder.

5. A method according to claim 4, further comprising the step of presenting an exchange rate to the cardholder, said exchange rate corresponding to a rate between the merchant's currency and the preferred currency.

6. A method according to claim 4, wherein the transaction details in the merchant's currency are also presented to the cardholder.

7. A method according to claim 1, further comprising the step of initially checking to determine if the transaction amount exceeds a predetermined minimum level for processing in an alternative currency to that of the merchant's currency.

8. A method according to claim 1, wherein the card holder is prompted as to whether the transaction is to be conducted in the preferred currency, including the steps of converting the transaction amounts to equivalent amounts in the preferred currency and presenting an exchange rate to the cardholder, said exchange rate corresponding to a rate between the merchant's currency and the preferred currency.

9. A method according to claim 1, wherein the card holder is prompted as to whether the transaction is to be conducted in the preferred currency, including the steps of converting the transaction amounts to equivalent amounts in the preferred currency, presenting said equivalent amounts for review by the cardholder, and presenting an exchange rate to the cardholder, said exchange rate corresponding to a rate between the merchant's currency and the preferred currency.

10. A data processing system for determining a preferred currency for association with a payment card transaction, the payment card having a card number, between a merchant and a payment card cardholder, said means comprising;
    means for obtaining the card number of the payment card from the cardholder,
    means for identifying an identifier code from said card number,
    means for determining the operating currency for said identifier code by comparing said identifier code with entries in a table, wherein each entry in said table contains an issuer identifier code or range of issuer identifier codes and a corresponding currency code, and
    means for setting the currency for association with the payment card transaction as the determined operating currency for the identifier code.

11. A data processing system according to claim 10, further comprising means for setting the preferred currency to the default currency of the merchant when no operating currency can be determined for the identifier code.

12. A data processing system according to claim 10, further comprising prompting means for prompting the cardholder as to whether the transaction is to be conducted in the preferred currency, said prompting means comprising conversion means for converting the transaction amounts to equivalent amounts in the preferred currency and presenting these amounts for review by the cardholder.

13. A data processing system according to claim 12, further comprising means for accepting an indication from the cardholder as to whether the transaction is to proceed in the preferred currency and means for permitting the transaction to be processed in the preferred currency if such an indication is received.

14. A data processing system according to claim 10, further comprising conversion means for converting at least one of the transaction amounts to an equivalent amount in the preferred currency and presenting this converted amount to the cardholder, optionally comprising means for presenting an exchange rate to the cardholder, said exchange rate corresponding to a rate between the merchant's currency and the preferred currency.

15. A data processing system according to claim 10, further comprising means for initially checking to determine if the transaction amount exceeds a predetermined minimum level for processing in an alternative currency to that of the merchant's currency.

16. A data processing system according to claim 10, wherein said data processing system is embodied in a payment card terminal.

17. A data processing system according to claim 10, wherein said data processing system is embodied in a central payment router.

18. A data processing system according to claim 10, wherein said data processing system is embodied in an authorisation host, optionally in co-operation with another system.

19. A data processing system according to claim 18, wherein said other system is a payment card terminal or central payment router.

20. A data processing system according to claim 10 further comprising means for connecting to a node in a computer network.

21. A data processing system according to claim 20, wherein the card number is received via the computer network.

22. A data processing system according to claim 10, further comprising prompting means for prompting the cardholder as to whether the transaction is to be conducted in the preferred currency, said prompting means comprising means for presenting an exchange rate to the cardholder, said exchange rate corresponding to a rate between the merchant's currency and the preferred currency.

23. A data processing system according to claim 10, further comprising prompting means for prompting the cardholder as to whether the transaction is to be conducted in the preferred currency, said prompting means comprising:
   conversion means for converting the transaction amounts to equivalent amounts in the preferred currency and presenting these amounts for review by the cardholder; and
   means for presenting an exchange rate to the cardholder, said exchange rate corresponding to a rate between the merchant's currency and the preferred currency.

24. A computer program encoding a set of computer instructions for use in a computing device for determining a preferred currency for association with a payment card transaction, the payment card having a card number, between a merchant and a payment card cardholder, comprising
   a computer code section which when executed on the computing device obtains the card number of the payment card from the cardholder,
   a computer code section which when executed on the computing device identifies an identifier code from said card number,
   a computer code section which when executed on the computing device determines the operating currency for said identifier code, by comparing said identifier code with entries in a table, wherein each entry in said table contains an issuer identifier code or range of issuer identifier codes and a corresponding currency code, and
   a computer code section which when executed on the computing device sets the currency for association with the payment card transaction as the determined operating currency for the identifier code.

25. A computer program according to claim 24, comprising a computer code section which when executed on the computing device sets the preferred currency to the default currency of the merchant when no operating currency can be determined for the identifier code.

26. A computer program according to claim 24, having a computer code section which when executed on the computing device prompts the cardholder as to whether the transaction is to be conducted in the preferred currency, including converting the transaction amounts to equivalent amounts in the preferred currency and presenting these amounts for review by the cardholder.

27. A computer program according to claim 24, comprising a computer code section which when executed on the computing device converts at least one of the transaction amounts to an equivalent amount in the preferred currency and presents the converted amount to the cardholder.

28. A computer program according to claim 27, comprising a code section which when executed on the computing device presents an exchange rate to the cardholder, said exchange rate corresponding to a rate between the merchant's currency and the preferred currency.

29. A computer program according to claim 27, comprising a computer code section which when executed on the computing device presents the transaction details in the merchant's currency to the cardholder.

30. A computer program according to claim 24, comprising a code section which when executed on the computing device initially checks to determine if the transaction amount exceeds a predetermined minimum level for processing in an alternative currency to that of the merchant's currency.

31. A computer program according to claim 24, having a computer code section which when executed on the computing device prompts the cardholder as to whether the transaction is to be conducted in the preferred currency, including presenting an exchange rate to the cardholder, said exchange rate corresponding to a rate between the merchant's currency and the preferred currency.

32. A computer program according to claim 24, having a computer code section which when executed on the computing device prompts the cardholder as to whether the transaction is to be conducted in the preferred currency, including converting the transaction amounts to equivalent amounts in the preferred currency, presenting these equivalent amounts for review by the cardholder and presenting an exchange rate corresponding to a rate between the merchant's currency and the preferred currency.

33. A method of operating a data processing system to conduct a financial transaction for the exchange of money provided by a payment card cardholder for a good or service provided by a merchant, said method comprising:
   obtaining a card number from said payment card;
   identifying, in said data processing system, an identifier code from said card number;
   determining an operating currency for said identifier code by comparing said identifier code with entries in a table that associates issuer identifier codes with currency codes;
   indicating said operating currency as being a preferred currency of exchange for said financial transaction;
   receiving a cardholder reply in response to said indicating activity; and
   completing said financial transaction in response to said receiving activity.

34. A method as claimed in claim 33 wherein:
   said cardholder reply instructs said data processing system to conduct said financial transaction using said preferred currency; and
   said completing activity completes said financial transaction using said preferred currency.

35. A method as claimed in claim 34 wherein:
   said indicating activity additionally indicates a currency exchange rate for converting from a merchant currency to said preferred currency; and
   said completing activity uses said currency exchange rate in completing said financial transaction.

36. A method as claimed in claim 34 wherein said indicating activity additionally indicates a first amount of money for said financial transaction using a merchant currency and a second amount of money for said financial transaction using said preferred currency.

* * * * *

(12) EX PARTE REEXAMINATION CERTIFICATE (9321st)
United States Patent
Barry

(10) Number: US 7,328,188 C1
(45) Certificate Issued: Oct. 2, 2012

(54) DYNAMIC CURRENCY CONVERSION FOR CARD PAYMENT SYSTEMS

(75) Inventor: Gerard J. Barry, Salthill (IE)

(73) Assignee: Mainline Corporate Holdings Limited, Aille, Inverin, Co. Galway (IE)

Reexamination Request:
No. 90/010,191, Jun. 11, 2008

Reexamination Certificate for:
Patent No.: 7,328,188
Issued: Feb. 5, 2008
Appl. No.: 09/613,679
Filed: Jul. 11, 2000

(51) Int. Cl.
*G06Q 40/00* (2006.01)
*G06Q 99/00* (2006.01)
(52) U.S. Cl. ........... 705/40; 705/39; 705/44; 705/76; 705/78; 705/79; 705/80; 235/379; 235/380
(58) Field of Classification Search .............. None
See application file for complete search history.

(56) References Cited

To view the complete listing of prior art documents cited during the proceeding for Reexamination Control Number 90/010,191, please refer to the USPTO's public Patent Application Information Retrieval (PAIR) system under the Display References tab.

*Primary Examiner* — Jeffrey R. Jastrzab

(57) ABSTRACT

The present invention relates to Card Payment Systems for use in a multi-currency environment. In particular, the present invention provides a system and method for identifying an appropriate currency for individual transactions conducted using a card payment system, using the steps of identifying (50) an identifier code (60(1-n)) from a payment card, and determining (52) from the identifier code (60(1-n)) a suitable currency (61(1-n)) for association with said payment card transaction. The identifier code is preferably a portion of the card number of the payment card. The transaction may be processed (54) in the suitable currency or the transaction amounts may be displayed in the suitable currency for information purposes.

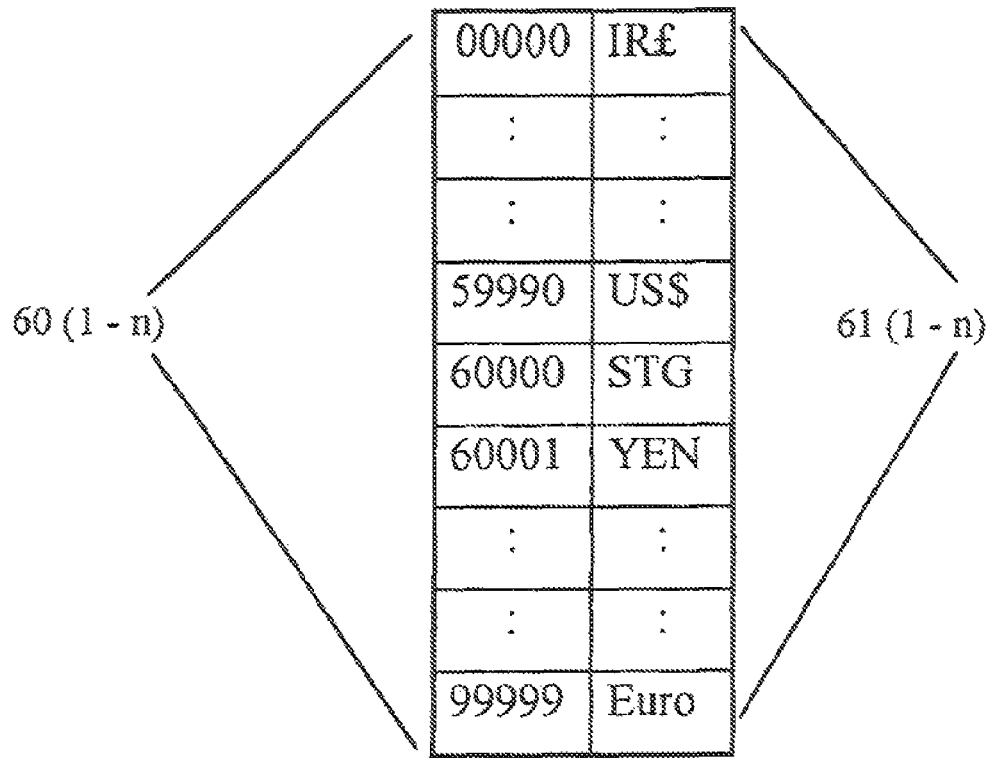

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 7, 15 and 30 is confirmed.

Claims 1-6, 8-14, 16-29 and 31-36 are cancelled.

* * * * *